H. E. DECKEBACH.
EVAPORATING PAN FOR DRIVING OFF ALCOHOL FROM MALT LIQUORS.
APPLICATION FILED JAN. 2, 1909.
1,040,287.
Patented Oct. 8, 1912.
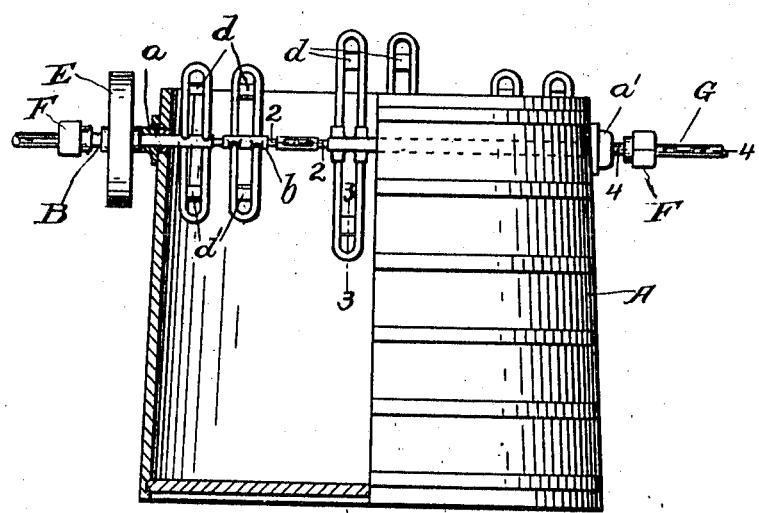
Fig. 1.
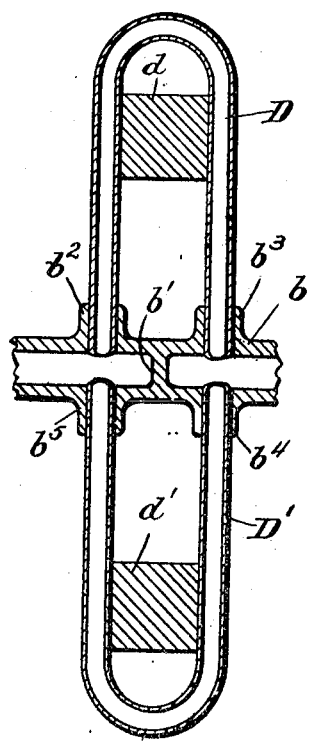
Fig. 2.
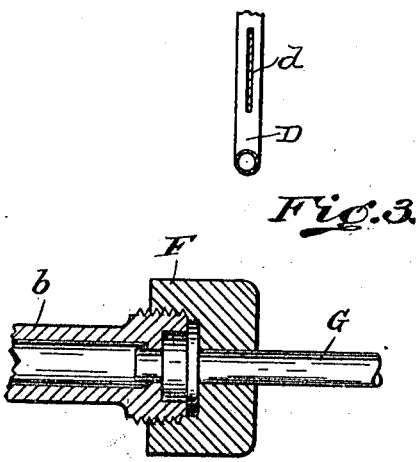
Fig. 3.
Fig. 4.
Witnesses
C. W. Miles
C. M. Palmiston
Inventor
Henry E. Deckebach
By Walter Murray
Attorney

UNITED STATES PATENT OFFICE.

HENRY E. DECKEBACH, OF CINCINNATI, OHIO.

EVAPORATING-PAN FOR DRIVING OFF ALCOHOL FROM MALT LIQUORS.

1,040,287.　　　　　Specification of Letters Patent.　　Patented Oct. 8, 1912.

Application filed January 2, 1909. Serial No. 470,452.

*To all whom it may concern:*

Be it known that I, HENRY E. DECKEBACH, a citizen of the United States of America, and resident of Cincinnati, county of Hamilton, State of Ohio, have invented certain new and useful Improvements in Evaporating-Pans for Driving Off Alcohol from Malt Liquors, of which the following is a specification.

The object of my invention is an apparatus for driving off the alcohol from malt liquors, such as beer, without impairing the taste thereof and without causing the liquor to foam unduly. This object is attained by the means described in the specification and illustrated in the accompanying drawings, in which, Figure 1 is a view partly in section and partly in elevation of an apparatus embodying my invention. Fig. 2 is an enlarged central sectional view of one of the paddles and is taken upon line 2—2 of Fig. 1. Fig. 3 is a detail view taken upon line 3—3 of Fig. 1. Fig. 4 is a similar view taken upon line 4—4 of Fig. 1.

Mounted rotatably in bearings, $a$, $a'$, near the top of the tub, A, is a shaft, B, which is constituted of a series of pipe sections, $b$, which are secured together. Short sections of pipe may be located between the sections $b$, as shown in Fig. 1, so that the shaft will consist of alternately arranged obstructed and unobstructed pipe. Each pipe section, $b$, has an internal diaphragm, $b'$, upon opposite sides of which are formed integral with the pipe sections, nipples, $b^2$, $b^3$, $b^4$, and $b^5$. Into nipples, $b^2$, $b^3$, the ends of a pipe D, which is bent into a U, are inserted. Similarly into nipples, $b^4$, $b^5$, the ends of a pipe, D', are inserted. Each of the pipes, D, D', carries a blade, $d$, $d'$, respectively. The pipe sections, $b$, the pipes D D' and the blades $d$, $d'$, thus constitute paddles which are mounted rotatably in the top of the tub, A. The pipe section adjacent to one side of the tub is projected through its bearing, $a$, and has secured upon it a pulley, E. The pipe sections at both the ends of the shaft, B, have a rotatable packing gland, F, which couples the pipe sections to pipes, G, as illustrated in Fig. 4.

In fitting the pipe sections together, they are placed in relative positions such that the paddles occupy varying angles to each other, as, for instance, starting at the center of the paddles, as illustrated in Fig. 1, the second one is shown at ninety degrees to the first one; the next one is shown at sixty degrees to the first one and the other one is shown at sixty degrees in the opposite direction. The purpose of this arrangement is that one or more of the paddles may be in the liquid at all times and that a thorough agitation of the liquid may be had.

In operation, steam or hot water is admitted through the pipe, G, to the first pipe section, $b$. It will pass thence through the bent pipes, D, D', to a point upon the opposite side of the diaphragm, $b'$, and thence will circulate in a similar manner through each of the successive paddles. The hot water or steam is kept at a degree such that the paddles will be heated to a degree somewhat less than two hundred and twelve degrees Fahrenheit. While the heated liquid is flowing through the paddles, the shaft, B, has a rotation imparted to it. The paddles then both heat the surface of the liquid and agitate the same, so as to cause the evaporation of the alcohol. The paddles, besides heating and agitating the surface of the liquid, create a current of air above the liquid so as to drive off the alcoholic vapors and thus facilitate the evaporation from the surface of the liquid. The paddles, likewise, beat down the foam which forms upon the surface of the liquid and prevent the same overflowing the tub. The liquid may be cooled by passing cold liquid through the paddles.

What I claim is:

In combination with a receptacle for liquids, a rotatable hollow shaft provided throughout its length with a plurality of obstructing diaphragms, U-shaped tubes mounted on said shaft, each tube subtending one of said diaphragms and communicating with the interior of said shaft on each side of the diaphragm so subtended, a paddle mounted on each tube, and means for delivering fluid to said shaft and said tubes.

HENRY E. DECKEBACH.

Witnesses:
　WALTER F. MURRAY,
　AGNES McCORMACK.